United States Patent
Ankala et al.

(10) Patent No.: US 8,745,273 B2
(45) Date of Patent: Jun. 3, 2014

(54) OUT-OF-BAND STATE MACHINE

(75) Inventors: Praveen Ankala, Portland, OR (US); Carey W. Smith, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 1403 days.

(21) Appl. No.: 11/021,498

(22) Filed: Dec. 22, 2004

(65) Prior Publication Data

US 2006/0165075 A1   Jul. 27, 2006

(51) Int. Cl.
*G06F 15/16* (2006.01)

(52) U.S. Cl.
USPC ............................ 709/250; 709/251; 709/252

(58) Field of Classification Search
USPC .......................................... 709/250; 370/389
See application file for complete search history.

(56) References Cited

U.S. PATENT DOCUMENTS

| | | | | |
|---|---|---|---|---|
| 6,141,705 | A * | 10/2000 | Anand et al. | 710/15 |
| 6,532,497 | B1 * | 3/2003 | Cromer et al. | 709/250 |
| 6,651,190 | B1 * | 11/2003 | Worley et al. | 714/43 |
| 6,681,244 | B1 * | 1/2004 | Cross et al. | 709/203 |
| 6,904,519 | B2 * | 6/2005 | Anand et al. | 713/100 |
| 7,249,181 | B2 * | 7/2007 | Helliwell | 709/226 |
| 2003/0110513 | A1 * | 6/2003 | Plourde et al. | 725/134 |
| 2005/0138213 | A1 * | 6/2005 | Lee et al. | 709/250 |
| 2005/0141499 | A1 * | 6/2005 | Ma et al. | 370/389 |
| 2006/0095961 | A1 * | 5/2006 | Govindarajan et al. | 726/15 |

FOREIGN PATENT DOCUMENTS

| | | |
|---|---|---|
| WO | 02/51153 A2 | 6/2002 |
| WO | 2006/069357 A1 | 6/2006 |

OTHER PUBLICATIONS

"PCT International Search Report PCT/US2005/046944", (Dec. 21, 2005), 3 pgs.
Office Action received for Taiwan, Patent Application No. 94145849, mailed Jun. 13, 2008, 4 Pages.
International Preliminary Report on Patentability, PCT/US2005/046944 dated Jul. 5, 2007, 6 pages.
Office Action received for Chinese Patent Application No. 200580044166.2, Mailed on Sep. 25, 2009, 10 pages of Office Action and English translation of 11 pages.
Office Action received for European Patent Application No. 05855494.0, Mailed on May 14, 2008, pp. 5.
Notice of Allowance received for Taiwanese Patent Application No. 94145849, Mailed on Jan. 19, 2009. 2 pages of Notice of Allowance and English translation of 1 pages.
Office Action received for Chinese Patent Application No. 200580044166.2, mailed on Apr. 29, 2010, 10 pages of Office Action and English translation of 13 pages.
Chinese Office Action for related Application No. 200580044166.2, mailed Oct. 9, 2011. 15 pages of English translation, 25 total pages.

(Continued)

*Primary Examiner* — Umar Cheema

(74) *Attorney, Agent, or Firm* — Grossman, Tucker, Perreault & Pfleger, PLLC

(57) ABSTRACT

In one embodiment, a method is provided. The method of this embodiment provides if an OOB (out-of-band) state machine has not received a confirmation from an operating system that the operating system is functional, the operating system using a primary IP (internet protocol) address, then if the OOB state machine is in a passive state, transitioning to an active state and obtaining an OOB IP address if the OOB state machine currently has no OOB IP address; and receiving one or more first packets using the OOB IP address.

28 Claims, 2 Drawing Sheets

(56) References Cited

OTHER PUBLICATIONS

China Office Action from related case CN200580044166.2 mailed Apr. 18, 2013.

Office Action received for Chinese Patent Application No. 200580044166.2, mailed on Nov. 28, 2013, 20 pages of Office Action including 11 pages of English Translation.

* cited by examiner

OUT-OF-BAND STATE MACHINE

FIELD

Embodiments of this invention relate to an out-of-band state machine.

BACKGROUND

Manageability refers to a system's ability to enable remote and local management, which may include, for example, system diagnostics, software updates, and/or system inventory. An important feature of manageability includes a system's ability to operate when an operating system is out-of-band. As used herein, "out-of-band" refers to a system's state in which an operating system may be non-functional, where "non-functional" means incapable of performing. For example, an operating system may be incapable of performing where it is not functioning correctly for its intended purpose, either partially or completely, or where its version has been outdated. For manageability purposes, however, there should still be some way of communicating with a system even when the system is out-of-band.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

Examples described below are for illustrative purposes only, and are in no way intended to limit embodiments of the invention. Thus, where examples may be described in detail, or where a list of examples may be provided, it should be understood that the examples are not to be construed as exhaustive, and do not limit embodiments of the invention to the examples described and/or illustrated.

Embodiments of the present invention may be provided, for example, as a computer program product which may include one or more machine-accessible media having machine-executable instructions that, when executed by one or more machines such as a computer, network of computers, or other electronic devices, may result in the one or more machines carrying out operations in accordance with embodiments of the present invention. A machine-accessible medium may include, but is not limited to, floppy diskettes, optical disks, CD-ROMs (Compact Disc-Read Only Memories), magneto-optical disks, ROMs (Read Only Memories), RAMs (Random Access Memories), EPROMs (Erasable Programmable Read Only Memories), EEPROMs (Electrically Erasable Programmable Read Only Memories), magnetic or optical cards, flash memory, or other type of media/machine-readable media suitable for storing machine-executable instructions.

Moreover, embodiments of the present invention may also be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection). Accordingly, as used herein, a machine-readable medium may, but is not required to, comprise such a carrier wave.

Figure 1:
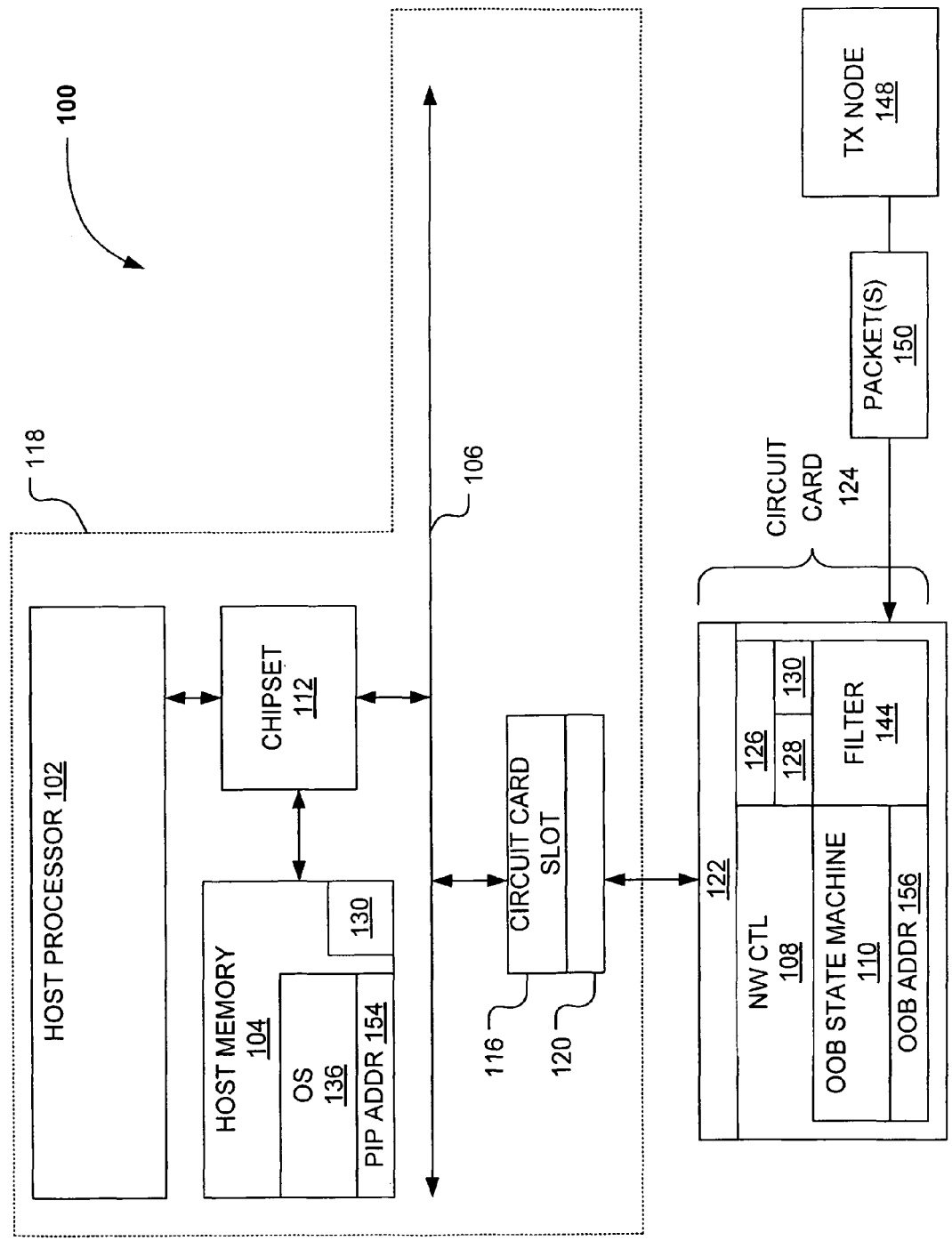
FIG. 1 illustrates a system embodiment.

FIG. 1 illustrates a system in one embodiment. System 100 may comprise host processor 102, host memory 104, bus 106, chipset 112, and network controller 108. System 100 may comprise more than one, and other types of processors, memories, buses, chipsets, and network controllers; however, those illustrated are described for simplicity of discussion. Host processor 102, host memory 104, bus 106, and chipset 112 may be comprised in a single circuit board, such as, for example, a system motherboard 118. System may comprise other components. For example, system 100 may further include other types of memories (not shown), such as flash memory, and one or more chipsets (not shown), including an I/O (input/output) controller hub to control communications among system 100 components.

Operations described herein may in general be performed by system 100 circuitry 126. In an embodiment, circuitry 126 may reside on a network controller 108 as illustrated in FIG. 1, but may reside elsewhere on system 100 without departing from embodiments of the invention. Circuitry 126 may comprise one or more digital circuits, one or more analog circuits, one or more state machines, programmable circuitry, and/or one or more ASIC's (Application-Specific Integrated Circuits). Alternatively, and/or additionally, operations described herein may be embodied in programs that may perform functions described herein. For example, operations may be embodied in program instructions 130 that may be executed by circuitry 126 to perform these operations. Circuitry 126 may execute instructions 130 in host memory 104, or circuitry 126 may execute instructions 130 stored in memory 128 comprised in circuitry 126. Memory 128 may, for example, comprise read only, mass storage, random access computer-accessible memory, and/or one or more other types of machine-accessible memories.

Network controller 108 may be comprised in a circuit card 124 that may be inserted into a circuit card slot 116. For example, network controller 108 may comprise a network interface card ("NIC"). When circuit card 124 is inserted into circuit card slot 116, PCI bus connector 120 on circuit card slot 116 may become electrically and mechanically coupled to PCI bus connector 122 on circuit card 124. When these PCI bus connectors 120, 122 are so coupled to each other, circuitry 126 may become electrically coupled to bus 106. When circuitry 126 is electrically coupled to bus 106, host processor 102 may exchange data and/or commands with circuitry 126 via bus 106 that may permit host processor 102 to control and/or monitor the operation of circuitry 126. In one or more alternative embodiments, network controller 108 may instead be comprised in a single circuit board, such as, for example, a system motherboard 118, or in a chipset, such as chipset 112.

Host processor 102 may comprise, for example, an Intel® Pentium® microprocessor that is commercially available from the Assignee of the subject application. Of course, alternatively, host processor 102 may comprise another type of microprocessor, such as, for example, a microprocessor that is manufactured and/or commercially available from a source other than the Assignee of the subject application, without departing from this embodiment.

Bus 106 may comprise a bus that complies with the Peripheral Component Interconnect (PCI) Local Bus Specification, Revision 2.2, Dec. 18, 1998 available from the PCI Special Interest Group, Portland, Oreg., U.S.A. (hereinafter referred to as a "PCI bus"). Alternatively, for example, bus 106 may comprise a bus that complies with the PCI Express Base Specification, Revision 1.0a, Apr. 15, 2003 available from the PCI Special Interest Group (hereinafter referred to as a "PCI Express bus"). Alternatively, bus 106 may comprise a bus that complies with the System Management (SM) Bus Specification, Version 2.0, Aug. 3, 2000 (hereinafter "SM Bus"). Bus 106 may comprise other types and configurations of bus systems.

Host memory 104 may store machine-executable instructions 130 that are capable of being executed, and/or data capable of being accessed, operated upon, and/or manipulated by circuitry, such as circuitry 126. Host memory 104 may, for example, comprise read only, mass storage, random access computer-accessible memory, and/or one or more other types of machine-accessible memories. The execution of program instructions 130 and/or the accessing, operation upon, and/or manipulation of this data by, for example, circuitry 126 may result in, for example, circuitry 126 carrying out some or all of the operations described herein.

Host memory 104 may comprise operating system 136 (labeled "OS"). Operating system 136, may be associated with a primary IP (internet protocol) address 154 ("PIP ADDR"). As used herein, "internet protocol" refers to a protocol for communicating on any internet, including but not limited to the Internet. Therefore, an "IP address" refers to an internet protocol identifier for a computer or device on an internet, which may include the Internet. For example, an internet may comprise the Internet, and an IP address may comprise the Internet Protocol address that may identify a computer or device on the Internet. However, embodiments of the invention are not limited to this, and an IP address may instead be any identifier that may identify a computer or device on any internet. An IP address may be statically assigned, for example by a user or a system such as a configuration server. For example, an IP address may be assigned by a configuration server, such as a DHCP (Dynamic Host Configuration Protocol) server. Of course, other configuration protocol servers may be used to obtain an IP address. Alternatively, an IP address may be dynamically assigned.

Chipset 112 may comprise a host bridge/hub system that may couple host processor 102, and host memory 104 to each other and to bus 106. For example, chipset 112 may comprise I/O (input/output) chipset or a memory chipset. Alternatively, host processor 102, host memory 104, and/or circuitry 126 may be coupled directly to bus 106, rather than via chipset 112. Chipset 112 may comprise one or more integrated circuit chips, such as those selected from integrated circuit chipsets commercially available from the Assignee of the subject application (e.g., graphics, memory, and I/O controller hub chipsets), although other one or more integrated circuit chips may also, or alternatively, be used.

System 100 may additionally comprise out-of-band state machine (hereinafter "OOB state machine") 110. "OOB state machine" refers to a component that may sustain a network connection when a system is out-of-band to enable the system to communicate with a transmitting node, and to enable transmitting node to forward one or more packets to a receiving node. As used herein, a "packet" refers to a sequence of one or more symbols and/or values that may be encoded by one or more signals transmitted from at least one sender to at least one receiver. There may be many types of packets, including data packets, protocol packets, and address packets, for example. Data packets may include information related to an application (e.g., email); protocol packets may include other types of information such as repairs and updates; and address packets may include address information.

In an embodiment, OOB state machine may be implemented as firmware in network controller 108, although embodiments of the invention are not limited in this respect. OOB state machine 110 may be in an active state or a passive state. In an embodiment, OOB state machine 110 may be in a passive state when operating system 136 is functional, and OOB state machine 110 may be in an active state when operating system 136 is non-functional.

OOB state machine 110 may comprise filter 144. When OOB state machine 110 is in a passive state, filter 144 may forward packets 150 sent from transmitting node ("TX NODE") 148 to both operating system 136 and OOB state machine 110. When OOB state machine 110 is in an active state, filter 144 may forward packets 150 sent from transmitting node 148 just to OOB state machine 110.

In an embodiment, if OOB state machine 110 is in a passive state, filter 144 may forward all packets 150 (e.g., address packets and protocol packets) to the operating system 136 (assuming packets 150 are destined to operating system 136 based on MAC—media access control—address, for example), and a subset of all packets 150 may be forwarded to OOB state machine 110. In an embodiment, a subset of all packets 150 forwarded to OOB state machine 110 may include address packets, such as packets from which OOB state machine 110 may obtain the operating system's 136 IP address. For example, this may include DHCP packets and/or ARP (Address Resolution Protocol) packets. DHCP packets may be transmitted from DHCP server in response to a request for an IP address, and ARP packets may be sent from an ARP server in response to system 100 requesting its IP address, for example.

Also, in an embodiment, if OOB state machine 110 is in an active state, filter 144 may forward address packets, and at least some protocol packets to OOB state machine 110. Protocol packets may include FTP (File Transfer Protocol) packets, and TFTP (Trivial File Transfer Protocol) packets, and may be transmitted from management server for repair of operating system 136, for example. OOB state machine 110 may also continue to receive address packets where addresses may expire, and new addresses may be assigned by a DHCP server, for example.

Filter 144 may forward one or more packets 150 to operating system 136 and/or OOB state machine 110 based on one or more packet characteristics. For example, filter 144 may use a combination of IP address, IP protocol number, and port number to determine whether packets 150 may be forwarded to operating system 136 and/or OOB state machine 110. In other words, depending on the values of these characteristics in the packets 150, the packets 150 may be forwarded to operating system 136, OOB state machine 110, or both. In an embodiment, filter 144 may be programmed by OOB state machine 110 to forward filter packets 150 based on a different set of values and/or a different set of characteristics.

OOB state machine 110 may be associated with an OOB IP address ("OOB IP ADDR") 156. In an embodiment, OOB IP address 156 may be requested, or may be snooped by OOB state machine 110. OOB IP address 156 may be requested, for example, from DHCP server when OOB state machine 110 is active. Alternatively, OOB IP address 156 may be snooped from one or more packets previously received when OOB state machine is inactive. As used herein, "snoop" refers to examining one or more packets for information. For example, the snooped information may include a destination IP address of the packet, which may be the operating system's 136 primary IP address 154, and OOB state machine 110 may use the destination IP address as the OOB IP address 156.

Figure 2:
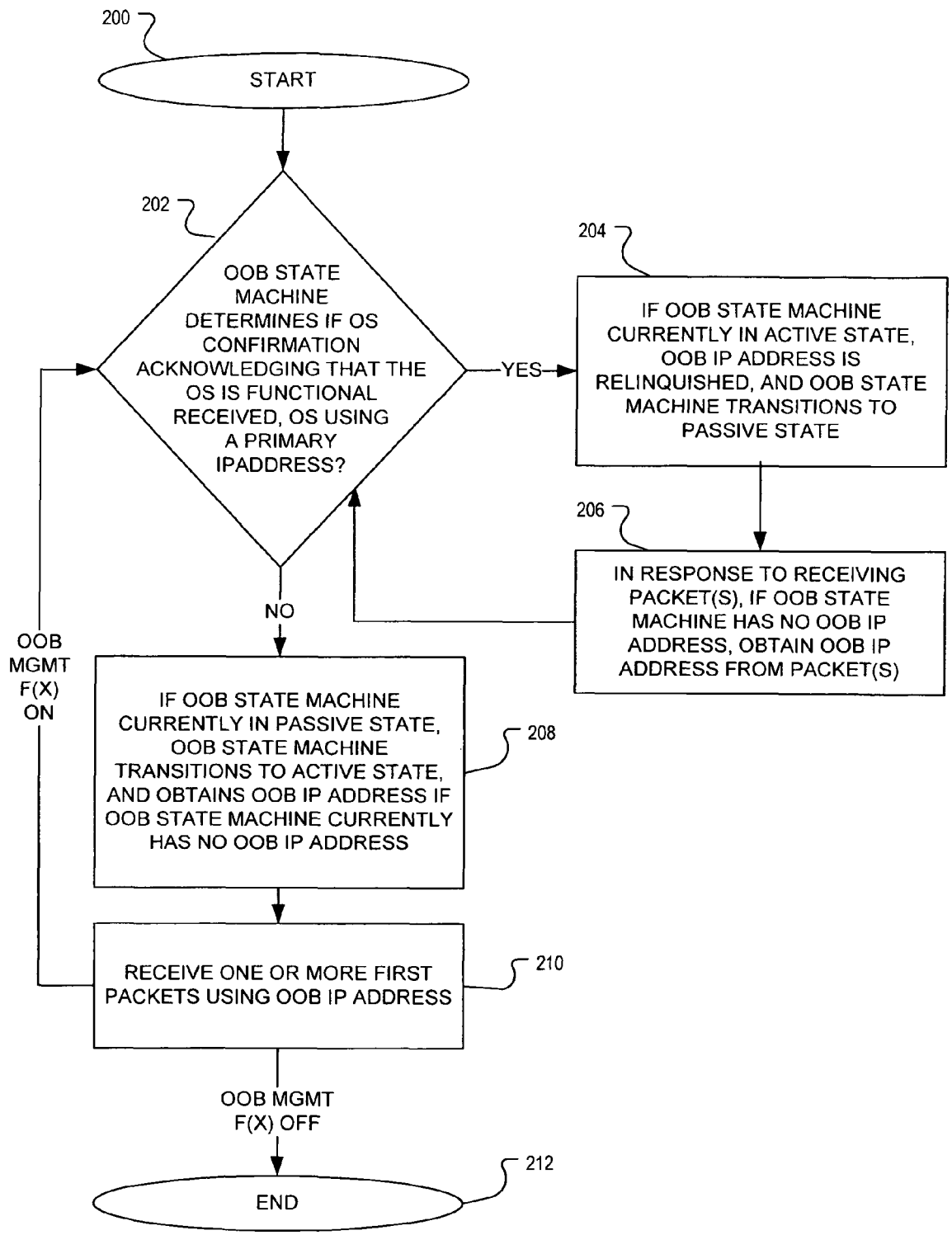
FIG. 2 is a flowchart that illustrates a method in one embodiment.

A method in accordance with an embodiment is illustrated in FIG. 2. The method of FIG. 2 may be performed by OOB state machine 110. The method of FIG. 2 begins at block 200 and continues to block 202 where OOB state machine 10 may determine if a confirmation acknowledging that operating system is functional has been received, where the operating system uses a primary IP address 154. In an embodiment, OOB state machine 110 may monitor bus 106 for a signal from operating system 136. The signal may be periodically sent from operating system 136, or may be requested by OOB state machine 110, for example. If a confirmation is received, the method may continue to block 204. Otherwise, the method may continue to block 208.

At block 204, if OOB state machine 110 is currently in an active state, then an OOB IP address 156 may be relinquished, and OOB state machine 110 may transition to a passive state. For example, OOB state machine 110 may still be in an active state if operating system 136 was non-functional on an immediately preceding confirmation check, but is now functional. OOB state machine 110 may be in a passive state if on an immediately preceding confirmation check, operating system 136 was functional, but is now non-functional. If OOB state machine 110 is active, then OOB state machine 110 may additionally go back to being passive, and allow operating system 136 to maintain its primary IP address 154 and to receive and process packets. The method may continue to block 206.

At block 206, in response to receiving one or more packets 150, if OOB state machine 110 does not have an OOB IP address 156, then an OOB IP address 156 may be obtained from the one or more packets 150. In an embodiment, filter 144 may receive one or more packets 150, and allow OOB state machine 110 to examine packets to, for example, obtain the OOB IP address 156 from one or more packets 150. Furthermore, operating system 136 may maintain its primary IP address 154, and filter 144 may additionally forward one or more packets 150 to operating system 136 to allow operating system to process one or more packets 150. One or more packets 150 may comprise data, including data to repair, patch, or upgrade operating system 136, or application data, for example. The method may continue back to block 202.

At block 208, OOB state machine 110 may transition to an active state, and an OOB IP address 156 may be obtained if OOB state machine 110 currently has no OOB IP address 156. Here, OOB state machine 110 may become active since operating system 136 has not confirmed that it is functional. If OOB state machine 110 has not previously obtained an OOB IP address 156, such as by snooping one or more packets 150 when operating system was functional, then OOB state machine 110 may request an IP address as discussed above. The method may continue to block 210.

At block 210, one or more first packets 150 may be received using the OOB IP address 156. Here, operating system 136 has not confirmed that it is functional, and OOB state machine 110 may maintain the OOB IP address 156 to process one or more packets 150. In an embodiment, OOB state machine 110 may send an alert to the management server prior to receiving one or more packets 150 using OOB IP address 156, where the alert may indicate to the management server that the operating system is inactive. Management server may then send data in one or more packets 150 to repair, patch, and/or upgrade operating system 136. OOB state machine 110 may process packets by using data to repair, patch, and/or upgrade operating system 136. In this manner, management server may remotely communicate with system 100 to, for example, install, repair, or reinstall the system's 100 operating system 136.

The method may continue to back to block 202 if OOB management functionality is still on. Otherwise the method may continue to block 212. For example, OOB management functionality may be on if system 100 is still operational (e.g., it is still powered on and functional). As another example, OOB management functionality may be on if such functionality may be enabled, and is still enabled.

At block 212, the method of FIG. 2 may end.

CONCLUSION

Therefore, in one embodiment, a method may comprise, if an OOB (out-of-band) state machine has not received a confirmation from an operating system that the operating system is functional, the operating system using a primary IP (internet protocol) address, then if the OOB state machine is in a passive state, transitioning to an active state and obtaining an OOB IP address if the OOB state machine currently has no OOB IP address; and receiving one or more first packets using the OOB IP address.

Embodiments of the invention enable, for example, a management server to access a managed client when the managed client's operating system is down so that, as an example, the management server may repair the operating system without requiring physical access to the managed client. Furthermore, embodiments enable this capability without requiring multiple IP addresses, which may involve significant expense in changing a current network infrastructure.

In the foregoing specification, various embodiments of the invention have been described. It will, however, be evident that various modifications and changes may be made to these embodiments without departing therefrom. The specification and drawings are, accordingly, to be regarded in an illustrative rather than a restrictive sense.

What is claimed is:

1. A method comprising:
   forwarding packets received from a transmission node from an OOB (out-of-band) state machine to at least an operating system when said OOB state machine is in a passive state;
   transitioning said OOB state machine from said passive state to an active state only if the operating system is non-functional;
   obtaining an OOB IP address to maintain a network connection by snooping at least one address packet received from said transmission node coupled to the OOB state machine to determine an IP address associated with the at least one address packet if the OOB state machine currently has no OOB IP address;
   setting the OOB IP address to the IP address associated with the at least one address packet; and
   receiving one or more first packets using the OOB IP address.

2. The method of claim 1, additionally comprising monitoring the operating system for a confirmation.

3. The method of claim 2, additionally comprising if a confirmation from an operating system is received:
   if the OOB state machine is currently in an active state, relinquishing the OOB IP address, and transitioning to a passive state; and
   in response to receiving one or more second packets, if the OOB state machine has no OOB IP address, then obtaining an OOB IP address from the one or more second packets.

4. The method of claim 3, wherein the one or more second packets comprise one or more address packets.

5. The method of claim 1, wherein the one or more first packets comprise at least one of:
   one of one or more address packets; and
   one or more protocol packets.

6. The method of claim 1, wherein said receiving one or more first packets using the OOB IP address is in response to:
sending an alert to a management server, the alert to indicate to the management server that the operating system is non-functional; and
the management server sending the one or more first packets to reinstate the operating system.

7. An apparatus comprising:
circuitry configured to:
forward packets received from a transmission node from said circuitry to at least an operating system when said circuitry is in a passive state;
detect that a confirmation from said operating system has not been received, the confirmation indicative that the operating system is functional;
transition said circuitry from said passive state to an active state only if the operating system is non-functional;
obtain an OOB (out-of-band) IP address to maintain a network connection by snooping at least one address packet received from said transmission node coupled to the circuitry to determine an IP address associated with the at least one address packet if the circuitry currently has no OOB IP address;
set the OOB IP address to the IP address associated with the at least one address packet; and
receive one or more first packets using the OOB IP address.

8. The apparatus of claim 7, the circuitry to additionally monitor the operating system for a confirmation.

9. The apparatus of claim 8, wherein if a confirmation from an operating system is received:
if the circuitry is currently in an active state, the circuitry to additionally relinquish the OOB IP address, and transition to a passive state; and
in response to receiving one or more second packets, if the circuitry has no OOB IP address, then the circuitry to additionally obtain an OOB IP address from the one or more second packets.

10. The apparatus of claim 9, wherein the one or more second packets comprise one or more address packets.

11. The apparatus of claim 7, wherein the one or more first packets comprise at least one of:
one of one or more address packets; and
one or more protocol packets.

12. The apparatus of claim 7, wherein the circuitry receives one or more packets using the IP address in response to:
sending an alert to a management server, the alert to indicate to the management server that the operating system is non-functional; and
the management server sending the one or more first packets to reinstate the operating system.

13. A system comprising:
a circuit board that includes a circuit card slot; and
a network interface card ("NIC") coupled to the circuit board via the circuit card slot, the NIC having circuitry configured to:
forward packets received from a transmission node from said circuitry to at least an operating system when said circuitry is in a passive state;
detect that a confirmation from said operating system has not been received, the confirmation indicative that the operating system is functional;
transition said circuitry from said passive state to an active state only if the operating system is non-functional;
obtain an OOB (out-of-band) IP address to maintain a network connection by snooping at least one address packet received from said transmission node coupled to the circuitry to determine an IP address associated with the at least one address packet if the circuitry currently has no OOB IP address;
setting the OOB IP address to the IP address associated with the at least one address packet; and
receive one or more first packets using the OOB IP address.

14. The system of claim 13, the circuitry to additionally monitor the operating system for a confirmation.

15. The system of claim 14, wherein if a confirmation from an operating system is received:
if the circuitry is currently in an active state, the circuitry to additionally relinquish the OOB IP address, and transition to a passive state; and
in response to receiving one or more second packets, if the circuitry has no OOB IP address, then the circuitry to additionally obtain an OOB IP address from the one or more second packets.

16. The system of claim 15, wherein the one or more second packets comprise one or more address packets.

17. The system of claim 13, wherein the one or more first packets comprise at least one of:
one of one or more address packets; and
one or more protocol packets.

18. The system of claim 13, wherein the circuitry receives one or more packets using the IP address in response to:
sending an alert to a management server, the alert to indicate to the management server that the operating system is non-functional; and
the management server sending the one or more first packets to reinstate the operating system.

19. An article comprising a non-transitory machine-readable storage medium having machine-accessible instructions, the instructions when executed by a machine, result in the following:
forwarding packets received from a transmission node from an OOB (out-of-band) state machine to at least an operating system when said OOB state machine is in a passive state;
transitioning said OOB state machine from said passive state to an active state only if the operating system is non-functional;
obtaining an OOB IP address to maintain a network connection by snooping at least one address packet received from said transmission node coupled to the OOB state machine to determine an IP address associated with the at least one address packet if the OOB state machine currently has no OOB IP address;
setting the OOB IP address to the IP address associated with the at least one address packet; and
receiving one or more first packets using the OOB IP address.

20. The article of claim 19, wherein the instructions additionally result in the OOB state machine monitoring the operating system for a confirmation.

21. The article of claim 20, wherein if a confirmation from an operating system is received, the instructions additionally result in:
if the OOB state machine is currently in an active state, the OOB state machine relinquishing the OOB IP address and transitioning the OOB state machine to a passive state; and
in response to receiving one or more second packets, if the OOB state machine has no OOB IP address, then the OOB state machine obtaining an OOB IP address from the one or more second packets.

22. The article of claim 21, wherein the one or more second packets comprise one or more address packets.

23. The article of claim 19, wherein the one or more first packets comprise at least one of:
one of one or more address packets; and
one or more protocol packets.

24. The article of claim 19, wherein said instructions that result in receiving one or more first packets using the OOB IP address are in response to instructions that result in:
the OOB state machine sending an alert to a management server, the alert to indicate to the management server that the operating system is non-functional; and
the management server sending the one or more first packets to the OOB state machine to reinstate the operating system.

25. The method of claim 1, wherein said obtaining an OOB IP address to maintain a network connection comprises requesting an address from a DHCP (Dynamic Host Configuration Protocol) server.

26. The apparatus of claim 7, wherein the circuitry obtains an OOB IP address to maintain a network connection by requesting an address from a DHCP (Dynamic Host Configuration Protocol) server.

27. The method of claim 1, further comprising forwarding packets received from the transmission node to both the operating system and the OOB state machine when the OOB state machine is in said passive state.

28. The method of claim 27, further comprising forwarding packets received from the transmission node to only the OOB state machine when the OOB state machine is in said active state.

* * * * *